United States Patent
Zhang et al.

(10) Patent No.: US 12,236,264 B2
(45) Date of Patent: Feb. 25, 2025

(54) DATA SHARDS FOR DISTRIBUTED PROCESSING

(71) Applicant: salesforce.com, inc., San Francisco, CA (US)

(72) Inventors: Yuxi Zhang, San Francisco, CA (US); Kexin Xie, San Mateo, CA (US)

(73) Assignee: Salesforce, Inc., San Francisco, CA (US)

( * ) Notice: Subject to any disclaimer, the term of this patent is extended or adjusted under 35 U.S.C. 154(b) by 919 days.

(21) Appl. No.: 17/163,386

(22) Filed: Jan. 30, 2021

(65) Prior Publication Data

US 2022/0244988 A1 Aug. 4, 2022

(51) Int. Cl.
| | |
|---|---|
| *G06F 9/48* | (2006.01) |
| *G06F 9/30* | (2018.01) |
| *G06F 9/38* | (2018.01) |
| *G06F 18/214* | (2023.01) |
| *G06N 20/00* | (2019.01) |
| *H04L 9/06* | (2006.01) |

(52) U.S. Cl.
CPC ........ *G06F 9/4881* (2013.01); *G06F 9/30036* (2013.01); *G06F 9/3836* (2013.01); *G06F 9/3851* (2013.01); *G06F 9/3877* (2013.01); *G06F 18/214* (2023.01); *G06N 20/00* (2019.01); *H04L 9/0643* (2013.01)

(58) Field of Classification Search
CPC .... G06F 9/4881; G06F 18/214; G06F 9/3836; G06F 9/3877; H04L 9/0643
USPC .......................................... 707/752
See application file for complete search history.

(56) References Cited

U.S. PATENT DOCUMENTS

| | | | |
|---|---|---|---|
| 9,110,955 B1* | 8/2015 | Bernhardsson | ... G06F 16/24578 |
| 9,971,544 B1* | 5/2018 | Johnson | .................. G06F 3/061 |
| 10,769,126 B1* | 9/2020 | Hagerup | ............. G06F 16/2453 |
| 10,853,148 B1* | 12/2020 | Kenney | .................. G06F 9/4881 |
| 10,855,767 B1* | 12/2020 | Froh | .......................... G06F 7/08 |
| 2015/0227521 A1* | 8/2015 | Levari | ................... G06F 16/278 |
| | | | 707/694 |
| 2016/0371589 A1* | 12/2016 | Golbandi | ............ G06F 16/9535 |
| 2019/0102476 A1* | 4/2019 | Liu | .......................... G06F 16/81 |
| 2019/0114537 A1* | 4/2019 | Wesolowski | ........... G06N 3/084 |
| 2020/0065303 A1* | 2/2020 | Bhattacharjee | ....... G06F 16/278 |
| 2020/0233863 A1* | 7/2020 | King | .................. G06F 16/9536 |
| 2020/0250747 A1* | 8/2020 | Padmanabhan | ...... G06Q 20/389 |
| 2020/0356537 A1* | 11/2020 | Sun | ..................... G06F 16/1734 |
| 2020/0372004 A1* | 11/2020 | Barber | .................. G06F 16/213 |

* cited by examiner

*Primary Examiner* — Hosain T Alam
*Assistant Examiner* — Nicholas E Allen
(74) *Attorney, Agent, or Firm* — Butzel Long

(57) ABSTRACT

Systems, devices, and techniques are disclosed for data shards for distributed processing. Data sets of data for users may be received. The data sets may belong to separate groups. User identifiers in the data sets may be hashed to generate hashed identifiers for the data sets. The user identifiers in the data sets may be replaced with the hashed identifiers. The data sets may be split to generate shards. The data sets may be split into the same number of shards. Merged shards may be generated by merging the shards using a separate running process for each of the merged shards. The merged shards may be generated using shards from more than one of the two or more data sets. An operation may be performed on all of the merged shards.

15 Claims, 11 Drawing Sheets

DATA SHARDS FOR DISTRIBUTED PROCESSING

BACKGROUND

Recommendation systems for products use a user's past behavior to determine what products to recommend to the user in order to induce the user to purchase, or take some other action, in relation to the product. Various machine learning models may be used in recommendation systems. Preparing user data to be used to train a machine learning model may be computationally intensive.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
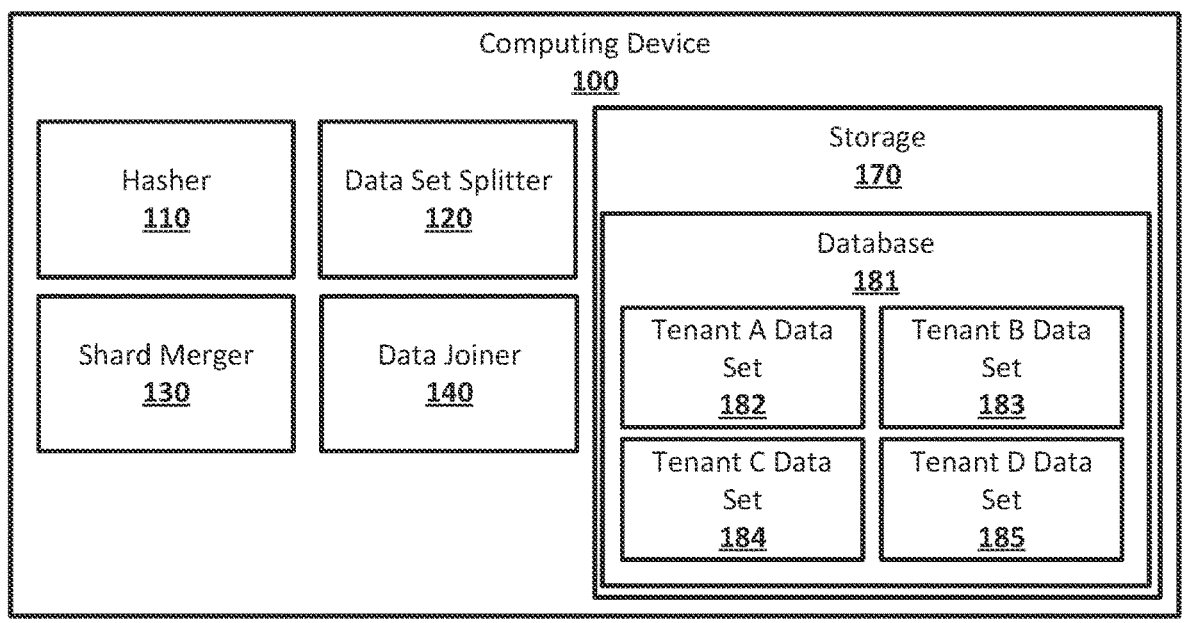
FIG. 1 shows an example system for suitable for data shards for distributed processing according to an implementation of the disclosed subject matter.

Techniques disclosed herein enable data shards for distributed processing, which may allow for data sets to be divided into shards and processed in a distributed manner. Data sets for users may be received for users belonging to multiple groups. User identifiers in the data sets may be hashed to generate hashed identifiers. The user identifiers in the data sets may be replaced with the hashed identifiers. The data sets may be split to generate shards, with each data set being split into the same number of shards. Shards from different data sets may be merged into merged shards. Operations may be performed on the merged shards.

Data sets belonging to multiple groups may be received. The data sets may include data for users belonging to the multiple groups. The groups may be any suitable groups, such as organizations and businesses, and may be, for example, tenants of a multi-tenant database system. For example, a customer relationship management database system may be used by multiple different organizations, each of which may be a tenant of the customer relationship management database system. Each tenant of a multi-tenant database system may have a data set storing data for its users in the multi-tenant data system. The data for users belonging to the groups may be any suitable data, such as, for example, data related to user interactions with items, such as products, made available by the groups. The data for a user may include items that a user has interacted with through actions and the actions taken by the user in interacting with the items. The actions may be, for example, related to the purchasing of the products, including, for example, submitting a search query to an online store that returns a webpage for a product as a result, viewing a webpage for a product, using any form of electronic communication to inquire or ask questions about a product, placing a product in a shopping cart of an online store, and purchasing a product from the online store. The data for a user may be stored as a row in a database, and may include an identifier for the user, such as, for example, a name of the user. A user may be, for example, a customer or subscriber of the groups that have data for the user.

Data from each of the groups may be stored separately. For example, each tenant of a multi-tenant database system may have data for its users segregated from data for other tenants' users even when there are users who are common between different tenants. The segregation of data sets from different groups may result in the same user identifier appearing in the data for users from different groups. Each group may only be able to access its own data, for example, with each tenant of a multi-tenant database system only having access to the data stored or otherwise owned by that tenant in the multi-tenant database system, and not having access to data stored by any other tenant unless granted access by that tenant. For users that are common to more than one group, each of the groups may only be able to access their own data for that user in their own data set, and may not be able to access any other groups' data for that user. This may maintain both the proprietary nature of a groups' data and user privacy.

The user identifiers in the received data sets may be hashed. The user identifiers for the users from the received data sets may be hashed or otherwise depersonalized in a consistent manner. For example, the same hashing algorithm may be used to hash all of the user identifiers in all of the received data sets to generate hashed identifiers. A hashed identifier may be generated for each occurrence of a user identifier in the received data sets, even when a user identifier appears in more than one of the data sets. The depersonalization of the identifiers for users in the data sets through hashing may result in the same user having the same hashed identifier across every data set that has data for that user. This may allow data from data sets from multiple groups for the same user to be merged without the original user identifier, which may include personally identifying information for the user. This may preserve the data privacy of both users and groups. A hashing algorithm used to generate hashed identifiers from user identifiers may be a one-way function. The hashed identifiers may be, for example, characters strings of any suitable length, using any suitable character sets.

In some implementations, the user identifiers in the data sets may not include personally identifying information, and may not need to be hashed or otherwise depersonalized.

The hashed identifiers generated from the user identifiers in the received data sets may be used to replace the user identifiers in the received data sets. A user identifier in a received data set may be replaced, within the received data set, with the hashed identifier generated from hashing or otherwise depersonalizing the user identifier. The received data sets may be copies of data sets stored in a database system, so that the user identifiers in the data sets stored in the database system are no replaced with hashed identifiers. The replacing of user identifiers with hashed identifiers in the received data sets may result in the received data sets no longer including personally identifying information for the users with data in the received data sets.

The received data sets may be split into shards. A received data set may be split into any suitable number of shards. The number of shards a received data set is split into may be based on, for example, a number of physical processors, or processor cores, available to process the received data sets in parallel. For example, if the received data sets are being processed on a computing system that will have ten separate physical processors, or processor cores, available to process the received data sets in parallel, a received data set may be split into ten shards. All of the received data sets may be split into the same number of shards. The shards generated by splitting a received data set may be of different sizes, including data for different numbers of users. Shards generated from splitting different received data sets may be of different sizes, including data for different numbers of users. The received data sets may be split into shards based on the hashed user identifiers. This may result in the shards partitioning the data in the data sets such that the equivalent shards across the received data sets include data for users with hashed identifiers in the same alphanumeric ranges. For example, a first shard from a first received data set and a first shard from a second received data set may include data for users with hashed identifiers that are in the same alphanumeric range, and the second shards from the first and second received data sets may include data for users with hashed identifiers in the same alphanumeric range that is different from the alphanumeric range used for the first shards. This may ensure that hashed identifiers that occur in more than one of the received data sets, for example, for users that are common to more than one group, are in equivalent shards from across the received data sets. For example, a user may have data in a data set for a first tenant and a third tenant, and not in a data set for the second tenant. When the received data sets for the first tenant and the third tenant are split into shards, the data for the user may be in the third shards generated from the received data sets for the both the first and third tenants. The third shard for the second tenant may not include the user data for the user, but would have included the user data for the user if the second tenant had data for the user in their data set.

The shards generated by splitting received data sets may be merged using separate processes to generate merged shards. Groups of equivalent shards from across the received data sets may be merged, generating a number of merged shards equal to the number of shards one of the received data sets was split into. Equivalent shards may be, for example, shards that include data for users with hashed identifiers in the same alphanumeric range. Merging equivalent shards may result in data for users that are common to more than one of the received data sets being merged. For example, a customer or subscriber may have interacted with products from different businesses that are tenants of the same multi-tenant database, resulting in different sets of data for that customer or subscriber being stored in the multi-tenant database by each tenant whose products the customer or subscriber interacted with. Data from multiple groups for the same user may be merged, for example, by appending the data for unique columns from the multiple groups to form the row for the user in the merged shard, and values for columns common to data from more than one of the multiple groups may be merged, for example, averaged or combined in any suitable manner, to produce single values for the common columns. For example, the same customer may purchase the same product from two different businesses, resulting in data for that customer from the two different businesses having a common column representing the purchase of that product. Merging the data for users common to multiple groups through the merging of equivalent shards may result in the merged shards including no duplicate hashed identifiers, as each unique user across all of the received data sets may be represented only once in the merged shards.

The received data sets may be split into shards in serial or in parallel. Splitting a received data set into shards may be performed a single processing job, using a single processor, that processes each hashed identifier in each data set in serial, or by multiple processing jobs, such as a separate processing job for each received data set running on a separate processors.

The equivalent shards from the received data sets may be merged using separate processes to generate the merged shards. Each group of equivalent shards may be merged using its own processing job. The processing job for merging equivalent shards into merged shard may join the data from the equivalent shards together, sort the joined data by hashed identifier, and then merge data for any duplicate hashed identifiers. The processing jobs for merging shards may be distributed among available on processors and cores to be processed in parallel. This may allow for the data from users that are common to multiple groups from whom data sets are received to be merged efficiently, without requiring that a single process sort all of the data sets by hashed identifier.

The merged shards may be treated as a single merged data set. For example, the merged shards, after being generated by separate processing jobs on separate processors, may be joined into a single merged data set using a single processor. Joining the merged shards may not be a computationally intense operation, as the data within each merged shard may already be merged and sorted by hashed identifier, and the merged shards may be ordered by the alphanumeric range of the hashed identifiers in the merged shard. Joining the merged shards in order may result in a single merged data set that is sorted by hashed identifier and that has no duplicate hashed identifiers.

The single merged data set may be used in any suitable manner. The single merged data set may, for example, be used as training data for a machine learning system of any suitable type. For example, the single merged data set may have non-negative matrix factorization performed on it to generate a matrix factorization model of the data in the data sets used to generate the single merged data set. The machine learning system generated using the single merged data set may be, for example, part of a product recommendation system associated with a multi-tenant database system from which the data sets were received. The single merged data set may also be used to train a machine learning system that is localized to one of the groups whose data set was used to generate the single merged data set. For example, after a machine learning system is trained using the single merged data set, a filter, such a bloom filter, may be used to extract data from the single merged data set for users from one of the groups whose data sets were used to generate the single merged data set. The extracted data may be used to further train the machine learning system, localizing the machine learning system to the group whose users' data was extracted from the single merged data set. The filter may operate using hashed identifiers to identify the data for users of the group whose data is being extracted.

FIG. 1 shows an example system for suitable for data shards for distributed processing according to an implementation of the disclosed subject matter. A computing device 100 may be any suitable computing device, such as, for example, a computer 20 as described in FIG. 5, or component thereof, for implementing data shards for distributed processing. The computing device 100 may include an identifier, a matrix factorizer 120, a data filter 130, and a storage 170. The computing device 100 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. The computing device 100 may be part of a computing system and network infrastructure, or may be otherwise connected to the computing system and network infrastructure, including a larger server network which may include other server systems similar to the computing device 100. The computing device 100 may include any suitable combination of central processing units (CPUs), graphical processing units (GPUs), and tensor processing units (TPUs).

The hasher 110 may be any suitable combination of hardware and software of the computing device 100 for hashing data, such as user identifiers. The hasher 110 may, for example, may implement any suitable hashing algorithms. The hasher 110 may apply hashing algorithms to data to generate hashed data, for example, hashing user identifiers from data sets to generate hashed identifiers. The hashing algorithms implemented by the hasher 110 may be one-way functions.

The data set splitter 120 may be any suitable combination of hardware and software of the computing device 100 for splitting data sets into shards. The data set splitter 120 may, for example, split a data set into k shards, where each of the k shards includes data from the data set that has an identifier, for example, hashed identifier, that falls within a specified alphanumeric range. The shards generated from a data set by the data set splitter may include all of the data from the data set, and no shard may include data that duplicates data in another shard. For example, the data set may be in the form of rows from a database. The data set splitter 120 may split the data set into k shards by assigning each of the rows of the data set to one of the k shards, and no row may be assigned to more than one of the k shards. A row may be assigned to a shard based on, for example, the identifier of the row and the alphanumeric range of identifiers of the shard.

The shard merger 130 may be any suitable combination of hardware and software of the computing device 100 for merging shards from data sets into merged shards. The shard merger 130 may, for example, merge equivalent shards from multiple data sets. The equivalent shards may be shards that have the same alphanumeric range. To merge shards from multiple data sets, the shard merger 130 may perform a join operation to join the data in the shards together, a sort operation to sort the joined data from the shards by identifier, such as, for example, by hashed identifier, and a merge operation to merge data that has the same identifier. For example, a user may have data in the data set of two different tenants of a multi-tenant database system, as the user may, for example, be a customer of both of the tenants. The data may be in the form of rows in databases of the tenants. When the data sets from the two tenants are split by the data set splitter 120, the data for the user may be assigned to the equivalent shards for both of the tenants, for example, based on hashed identifier generated by the hasher 110 from the user identifier for the user. The shard merger 130 may join the shards from the two different tenants together and sort the joined data, resulting in two consecutive rows that have the same identifier. The shard merger 130 may merge the data from the two consecutive rows that have the same identifier into one row, as they may include data for the same user.

The data joiner 140 may be any suitable combination of hardware and software of the computing device 100 for joining data. The data joiner 140 may, for example, join merged shards into a single merged data set. The merged shards may already be sorted alphanumerically by identifier, for example, hashed identifier, both internally and among each other, so that data joiner 140 may only need to join the merged shards together in order based on the alphanumeric ranges that were used for the shards merged by the shard merger 130.

The hasher 110, data set splitter 120, shard merger 130, and data joiner 140 may all be components or features of a database management system of the computing device 100, or may separate or stand-alone components or executables of the computing device 100.

The storage 170 may be any suitable combination of hardware and software for storing data. The storage 170 may include any suitable combination of volatile and non-volatile storage hardware, and may include components of the computing device 100 and hardware accessible to the computing device 100, for example, through wired and wireless direct or network connections. The storage 170 may store a database 181. The database 181 may be, for example, a multi-tenant database. The database 181 may store tenant A data set 182, tenant B data set 183, tenant C data set 184, and tenant D data set 185. The tenant A data set 182 may be a data set including data for users of a tenant A of the database 181, which may be, for example, a business or other organization that may have users, who may be, for example, customers or subscribers. The tenant B data set 183 may be a data set including data for users of a tenant B of the database 181, which may be, for example, a business or other organization that may have users, who may be, for example, customers or subscribers. The tenant C data set 184 may be a data set including data for users of a tenant C of the database 181, which may be, for example, a business or other organization that may have users, who may be, for example, customers or subscribers. The tenant D data set 185 may be a data set including data for users of a tenant D of the database 181, which may be, for example, a business or other organization that may have users, who may be, example, customers or subscribers. The data in the data sets may be event data, for example, data regarding items that a user has interacted with through actions and the actions taken by the user in interacting with the items, or any other suitable data about a user. The tenant A data set 182, tenant B data set 183, tenant C data set 184, and tenant D data set 185 may be stored in the database 181 in any suitable manner. For example, each user of tenant A may have their data stored in a separate row of the database 181, with the rows for the users of tenant A forming the tenant A data set 182. Data for different tenants of the database 181 may be stored in the same table of the database 181, or may be stored in different tables. The database 181 may segregate access to data on a per-tenant basis, such that, for example, tenant A may have access to the tenant A data set 182 but not to the tenant B event 183, the tenant C data set 184, or the tenant D data set 185.

Figure 2A:
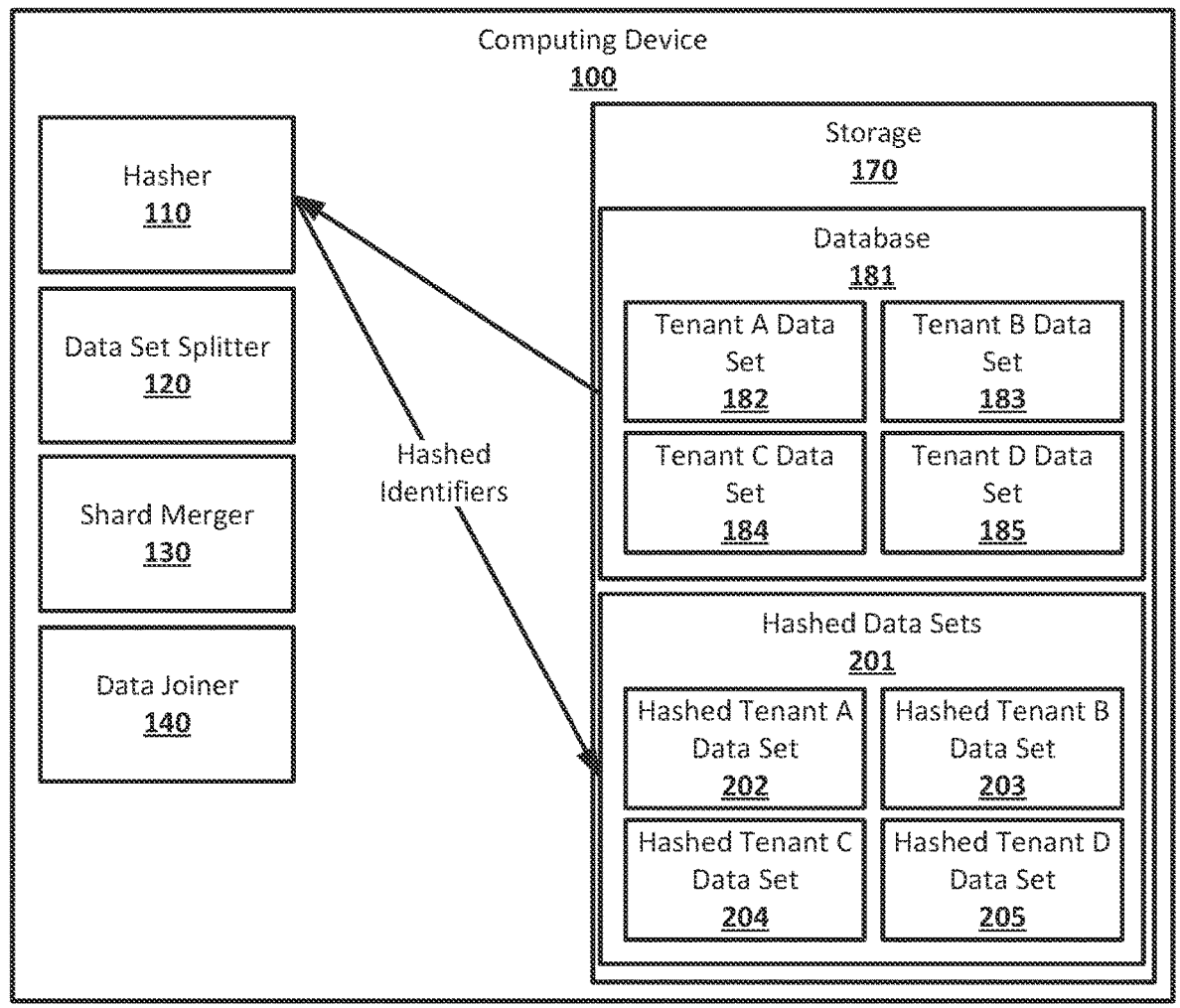
FIG. 2A shows an example arrangement suitable for data shards for distributed processing according to an implementation of the disclosed subject matter.

FIG. 2A shows an example arrangement for suitable for data shards for distributed processing according to an implementation of the disclosed subject matter. The hasher 110 may generate hashed identifiers for data sets that will be merged. For example, the hasher 110 may receive the tenant A data set 182, tenant B data set 183, tenant C data set 184, and tenant D data set 185 from the database 181. The tenant A data set 182, tenant B data set 183, tenant C data set 184, and tenant D data set 185 may include data in rows, and each row may include a user identifier for the user that the data in row is for. The hasher 110 may apply the same hashing algorithm to all of the user identifiers in the tenant A data set 182, tenant B data set 183, tenant C data set 184, and tenant D data set 185 to generate hashed identifiers. The hasher 110 may then replace the user identifiers in the tenant A data set 182, tenant B data set 183, tenant C data set 184, and tenant D data set 185 with the hashed identifiers generated from the user identifiers, and store the results as hashed data sets 201, including hashed tenant A data set 202, hashed tenant B data set 203, hashed tenant C data set 204, and hashed tenant D data set 205. The hashed tenant A data set 202 may include all of the data from the tenant A data set 182, except with user identifiers replaced with the hashed identifiers generated from the user identifiers by the hasher 110. The hashed tenant B data set 203, hashed tenant C data set 204, and hashed tenant D data set 205 may similarly include all of the data from the tenant B data set 183, tenant C data set 184, and tenant D data set 185, respectively, with user identifiers replaced with hashed identifiers. This may result in the hashed data sets 201 being depersonalized or deidentified versions of the tenant A data set 182, tenant B data set 183, tenant C data set 184, and tenant D data set 185 from the database 181. Depersonalization may allow the data from the tenant A data set 182, tenant B data set 183, tenant C data set 184, and tenant D data set 185 to be merged while preserving the privacy and data security of both the users who have data in the database 181 and of the tenants to whom the data sets in the database 181 belong.

The hashed data sets 201 may be stored in any suitable manner. For example, the hashed data sets 201 may be stored in the storage 170 as part of the database 181 or as part of a separate database, for example, with the data being exported from the database 181. The hashed data sets 201 may not replace the tenant A data set 182, tenant B data set 183, tenant C data set 184, and tenant D data set 185, which may be stored in the database 181 with un-hashed user identifiers.

Figure 2B:
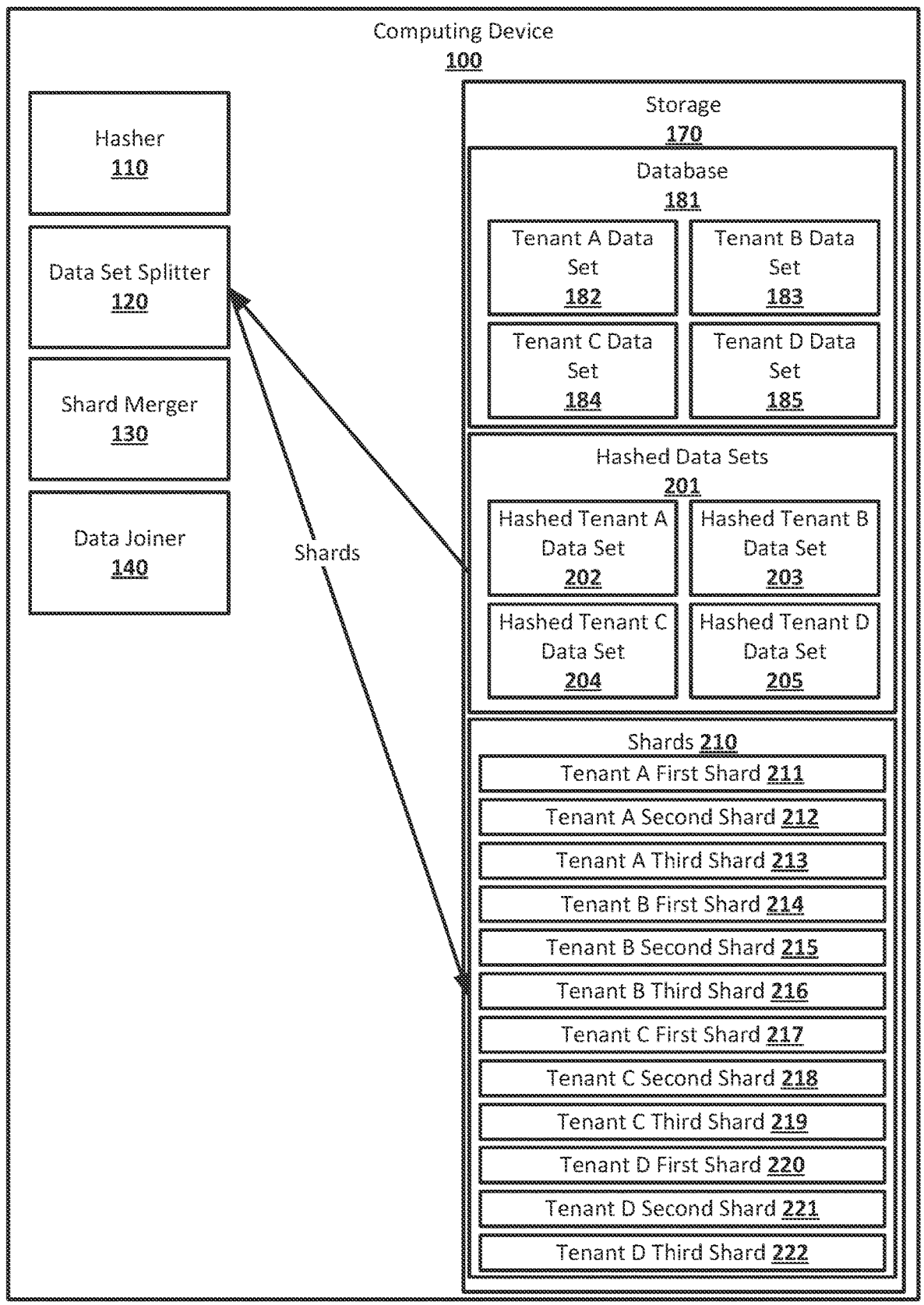
FIG. 2B shows an example arrangement suitable for data shards for distributed processing according to an implementation of the disclosed subject matter.

FIG. 2B shows an example arrangement for suitable for data shards for distributed processing according to an implementation of the disclosed subject matter. The data splitter 120 may split the hashed data sets 201 into shards. For example, the data set splitter 120 may split each of the hashed tenant B data set 203, hashed tenant C data set 204, and hashed tenant D data set 205 into three shards. The data set splitter 120 may assign data from the hashed data sets 201 to shards in any suitable manner as long as all of the data sets that will be merged are split in the same manner. For example, the data set splitter 120 may split the hashed tenant B data set 203, hashed tenant C data set 204, and hashed tenant D data set 205 into shards based on the alphanumeric ranges the hashed identifiers fall into. The hashed tenant A data set 102 may be split into tenant A first shard 211, tenant A second shard 212, and tenant A third shard 213, which may be stored with shards 210. The hashed identifiers may, for example, have a length of the six characters, and may use only hexadecimal characters. The data set splitter 120 may, for example, assign rows of data from the hashed tenant A data set 202 that have a hashed identifier that falls in an alphanumeric range of 000000 to 5FFFFF to the tenant A first shard 211. The data set splitter 120 may assign rows of data from the hashed tenant A data set 202 that have a hashed identifier that falls in an alphanumeric range of 600000 to AFFFFF to the tenant A second shard 212. The data set splitter 120 may assign rows of data from the hashed tenant A data set 202 that have a hashed identifier that falls in an alphanumeric range of B00000 to FFFFFF to the tenant A third shard 213. The data set splitter 120 may split the hashed tenant B data set 203, hashed tenant C data set 204, and hashed tenant D data set 205 in the same manner as the hashed tenant data A data set 202. The rows from the hashed tenant B data set 203 that have a hashed identifier in the range 000000 to 5FFFFF may be assigned to the tenant B first shard 214, the rows that have a hashed identifier in the range 600000 to AFFFFF may be assigned to the tenant B second shard 215, and the rows that have a hashed identifier in the range B00000 to FFFFFF may be assigned to the tenant B third shard 216. The rows from the hashed tenant C data set 204 that have a hashed identifier in the range 000000 to 5FFFFF may be assigned to the tenant C first shard 217, the rows that have a hashed identifier in the range 600000 to AFFFFF may be assigned to the tenant C second shard 218, and the rows that have a hashed identifier in the range B00000 to FFFFFF may be assigned to the tenant C third shard 219. The rows from the hashed tenant D data set 205 that have a hashed identifier in the range 000000 to 5FFFFF may be assigned to the tenant D first shard 220, the rows that have a hashed identifier in the range 600000 to AFFFFF may be assigned to the tenant D second shard 221, and the rows that have a hashed identifier in the range B00000 to FFFFFF may be assigned to the tenant D third shard 222.

The shards 210 may include data for different numbers of users, and it may be possible for some of the shards 210 to be empty, including data for no users. In some implementations, the partitioning of the alphanumeric range may be chosen to balance the number of users in each shard.

All of the shards generated by the data set splitter 120 may be stored with the shards 210. The shards 210 may be stored in any suitable manner, including, for example, as part of the database 181 or as part of a separate database, for example, with the data being exported from the database 181.

Figure 2C:
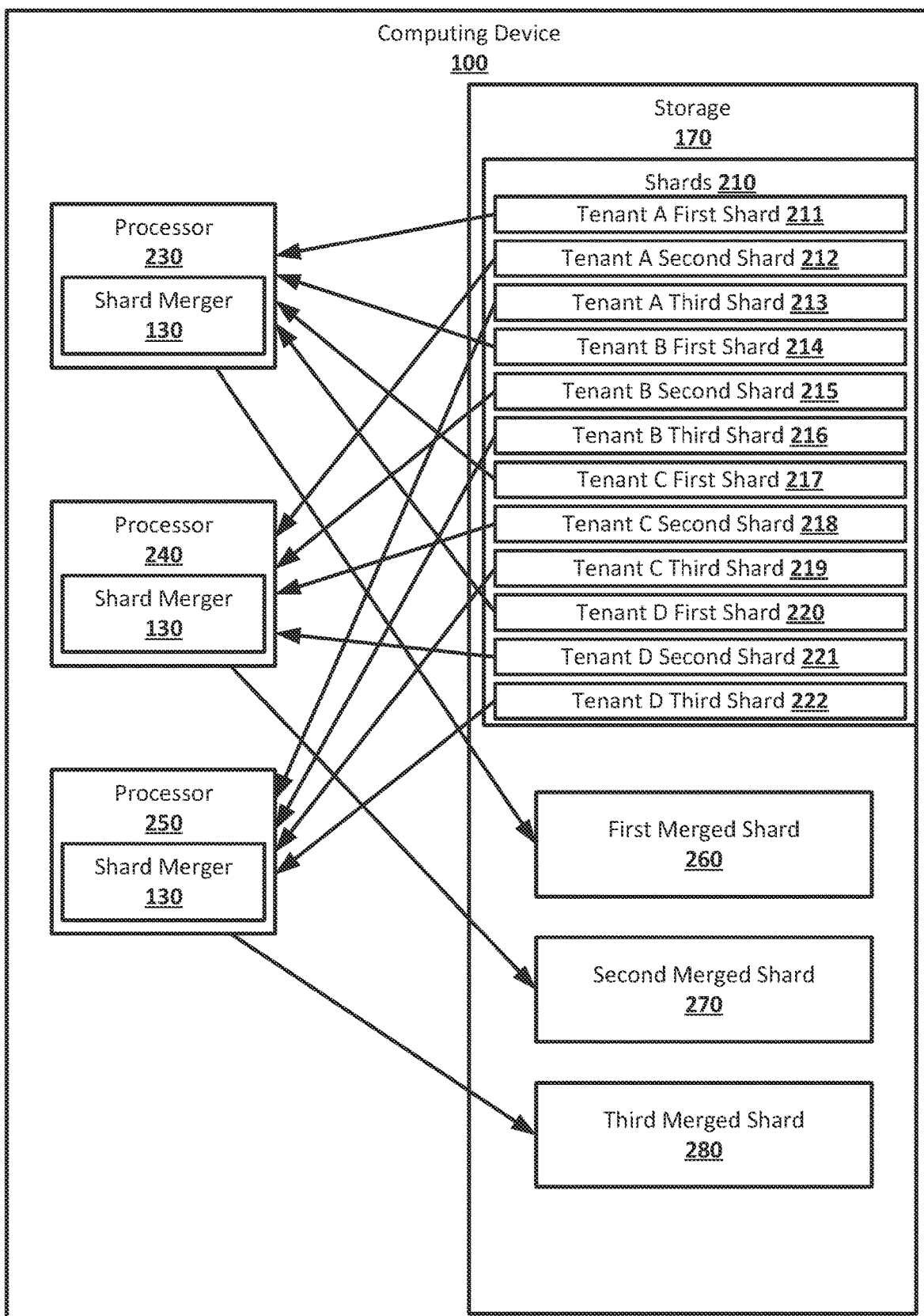
FIG. 2C shows an example arrangement suitable for data shards for distributed processing according to an implementation of the disclosed subject matter.

FIG. 2C shows an example arrangement for suitable for data shards for distributed processing according to an implementation of the disclosed subject matter. The shard merger 130 may merge shards 210 to generate merged shards. The shard merger 130 may run as a separate processing job on several separate processors. For example, when the data sets being merged have been divided into three shards each, the shard merger 130 may run on three separate processors for maximum parallelism. The shard merger 130 may, for example, run on a processor 230, processor 240, and processor 250, which may each be separate physical processors, or separate cores of a single processor capable of operating in parallel. The processors 230, 240 and 250 may be part of the same physical computing system, for example, if the computing device 100 is a single device, or part of different, network connected physical computing systems, for example, if the computing device 100 is a networked computing system such as a server system with devices distributed over any suitable area. Each running process of the shard merger 130 may merge equivalent shards, for example, shards that were assigned data with the same alphanumeric of hashed identifiers.

The shard merger 130 running on the processor 230 may merge first shards, for example, the tenant A first shard 211, tenant B first shard 214, tenant C first shard 217, and tenant D first shard 220, into a merged shard, for example, first merged shard 260. The shard merger 130 may join the rows of the tenant A first shard 211, tenant B first shard 214, tenant C first shard 217, and tenant D first shard 220 using a join operation, sort the result of the join operation by hashed identifier, and then merge data for any rows that have the same hashed identifier so that every hashed identifier in the first merged shard 260 is unique within the first merged shard 260. This may result in the first merged shard 260 including a single row of data for any users with data in the tenant A data set 182, tenant B data set 183, tenant C data set 184, or tenant D data set 185 whose hashed identifier is within the range 000000 to 5FFFFF, even if the user has data in more than one of the data sets.

The shard merger 130 running on the processor 240 may merge second shards, for example, the tenant A second shard 212, tenant B second shard 215, tenant C second shard 218, and tenant D second shard 221, into a merged shard, for example, second merged shard 270. The shard merger 130 may join the rows of the tenant A second shard 212, tenant B second shard 215, tenant C second shard 218, and tenant D second shard 221 using a join operation, sort the result of the join operation by hashed identifier, and then merge data for any rows that have the same hashed identifier so that every hashed identifier in the second merged shard 270 is unique within the second merged shard 270. This may result in the second merged shard 270 including a single row of data for any users with data in the tenant A data set 182, tenant B data set 183, tenant C data set 184, or tenant D data set 185 whose hashed identifier is within the range 600000 to AFFFFF, even if the user has data in more than one of the data sets.

The shard merger 130 running on the processor 240 may merge third shards, for example, the tenant A third shard 213, tenant B third shard 216, tenant C third shard 219, and tenant D third shard 222, into a merged shard, for example, third merged shard 280. The shard merger 130 may join the rows of the tenant A third shard 213, tenant B third shard 216, tenant C third shard 219, and tenant D third shard 222 using a join operation, sort the result of the join operation by hashed identifier, and then merge data for any rows that have the same hashed identifier so that every hashed identifier in the third merged shard 280 is unique within the third merged shard 280. This may result in the third merged shard 280 including a single row of data for any users with data in the tenant A data set 182, tenant B data set 183, tenant C data set 184, or tenant D data set 185 whose hashed identifier is within the range B00000 to FFFFFF, even if the user has data in more than one of the data sets.

The first merged shard 260, second merged shard 270, and third merged shard 280 may be generated in a parallel by the processors 230, processor 240, and processor 250, as there may be no data dependencies among the merged shards.

Figure 2D:
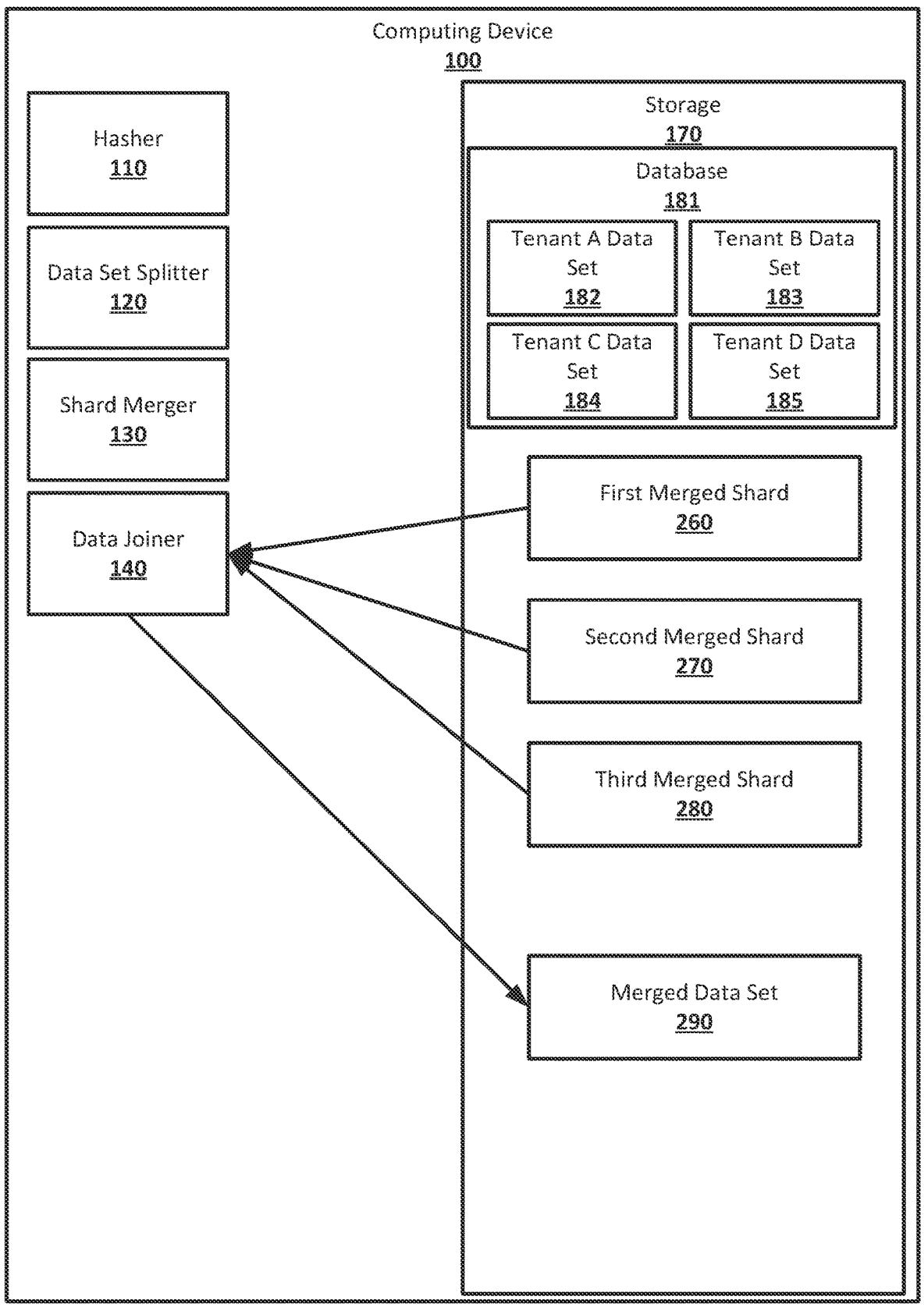
FIG. 2D shows an example arrangement suitable for data shards for distributed processing according to an implementation of the disclosed subject matter.

FIG. 2D shows an example arrangement for suitable for data shards for distributed processing according to an implementation of the disclosed subject matter. The data joiner 140 may join the first merged shard 260, second merged shard 270, and third merged shard 280 into a merged data set 290. The merged data set 290 may include all of the data from the data from the tenant A data set 182, tenant B data set 183, tenant C data set 184, and tenant D data set 185, with a single row for each unique user, sorted by hashed identifier. In some implementations, the first merged shard 260, second merged shard 270, and third merged shard 280 may be joined in any order, as the merged data set 290 may not need to be sorted by hashed identifier.

The merged data set 290 may be used in any suitable manner. For example, the merged data set 290 may be used as training data set for a machine learning system, including, for example, a neural network or non-negative matrix factorization model. For example, non-negative matrix factorization may be performed on the merged data set 290 to generate a non-negative matrix factorization model for the tenant A data set 182, tenant B data set 183, tenant C data set 184, and tenant D data set 185. A non-negative matrix factorization model generated from the merged data set 290 may be localized by, for example, extracting data for users from a particular tenant from the merged data set 290 and using this data to augment and re-train an already generated non-negative matrix factorization model.

The generation of the first merged shard 260, second merged shard 270, and third merged shard 280, and their use to generate the merged data set 290 may be more efficient than attempting to join, sort, and merge all of the data from the tenant A data set 182, tenant B data set 183, tenant C data set 184, and tenant D data set 185 as a single process, or in a distributed manner without first splitting the data sets into shards.

Figure 3A:
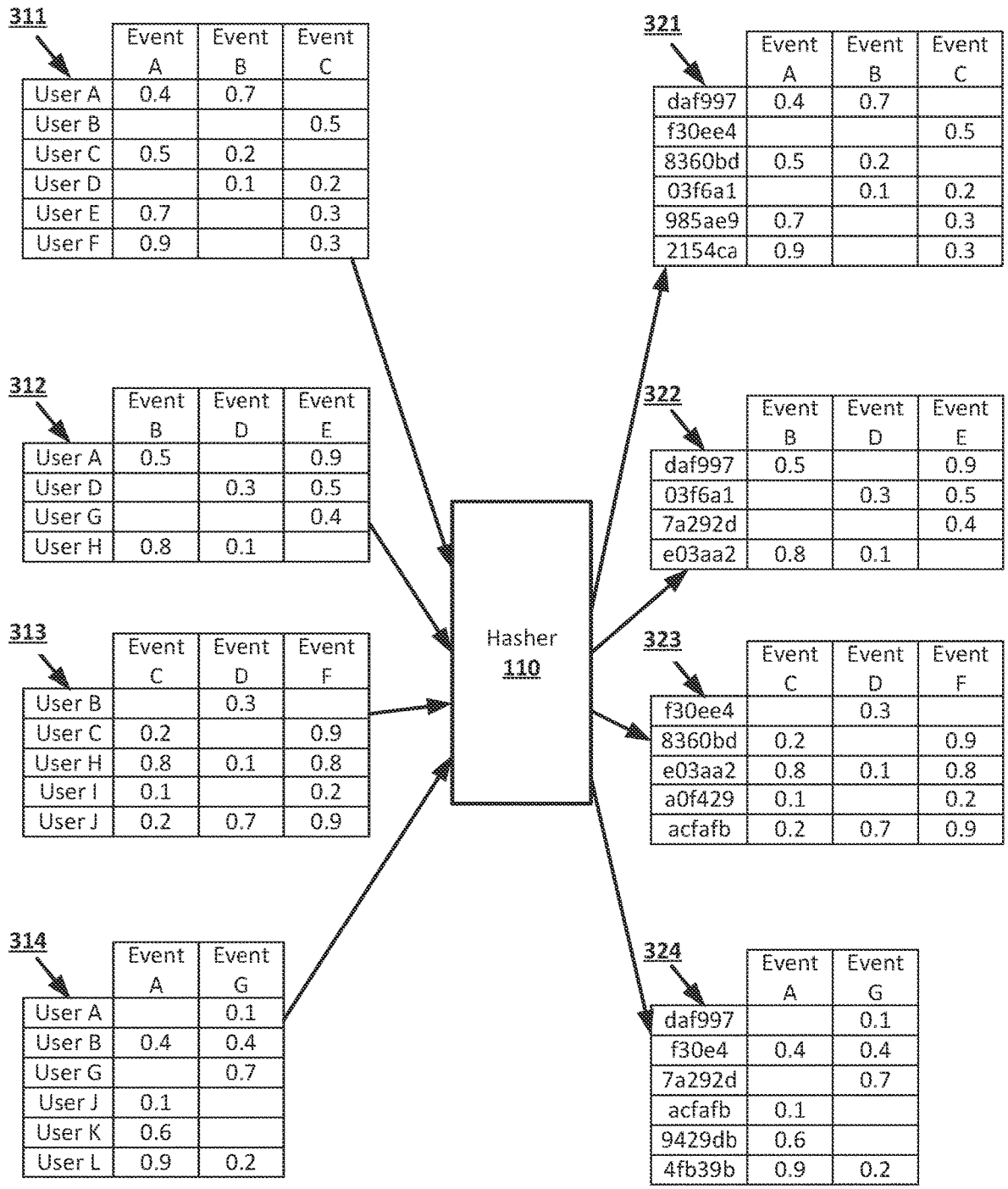
FIG. 3A shows an example arrangement suitable for data shards for distributed processing according to an implementation of the disclosed subject matter.

FIG. 3A shows an example arrangement for suitable for data shards for distributed processing according to an implementation of the disclosed subject matter. A table 311 may represent the tenant A data set 182, and may include data for users of the tenant A, which may be, for example, values indicating the preference of users A, B, C, D, E, and F of tenant A regarding events A, B and C, which may be, for example, items or products and actions related to items or products offered by the tenant A, which may be a business or other organization. A table 312 may represent the tenant B data set 183, and may include data for users of the tenant B, which may be, for example, values indicating the preference of users A, D, G, and H of tenant B regarding events B, D, and E, which may be, for example, items or products and actions related to items or products offered by the tenant B, which may be a business or other organization. A table 313 may represent the tenant C data set 184, and may include data for users of the tenant C, which may be, for example, include values indicating the preference of users B, C, H, I, and J of tenant C regarding events C, D, and F, which may be, for example, items or products and actions related to items or products offered by the tenant C, which may be a business or other organization. A table 314 may represent the tenant D data set 185, and may include data for users of the tenant D, which may be, for example, values indicating the preference of users A, B, G, J, K, and L of tenant D regarding events A and G which may be, for example, items or products and actions related to items or products offered by the tenant D, which may be a business or other organization.

The tables 311, 312, 313, and 314, representing the tenant A data set 182, tenant B dataset 183, tenant C data 184, and tenant D data set 185 which are to be merged, may be input to the hasher 110. The hasher 110 may hash the user identifiers in the tables 311, 312, 313, and 314, which may the first column of each table to generate hashed identifiers, using the same hashing algorithm for all user identifiers. The hashed identifiers may then be used to replace the user identifiers they were generated from, generating the tables 321, 322, 323, and 324, which may represent the hashed tenant A data set 202, hashed tenant B data set 203, hashed tenant C 204 data set, and hashed tenant D data set 205. User identifiers common to more than one data set, for example, the user A, may be replaced with the same hashed identifier. This may depersonalize the hashed tenant A data set 202, hashed tenant B data set 203, hashed tenant C 204 data set, and hashed tenant D data set 205

Figure 3B:
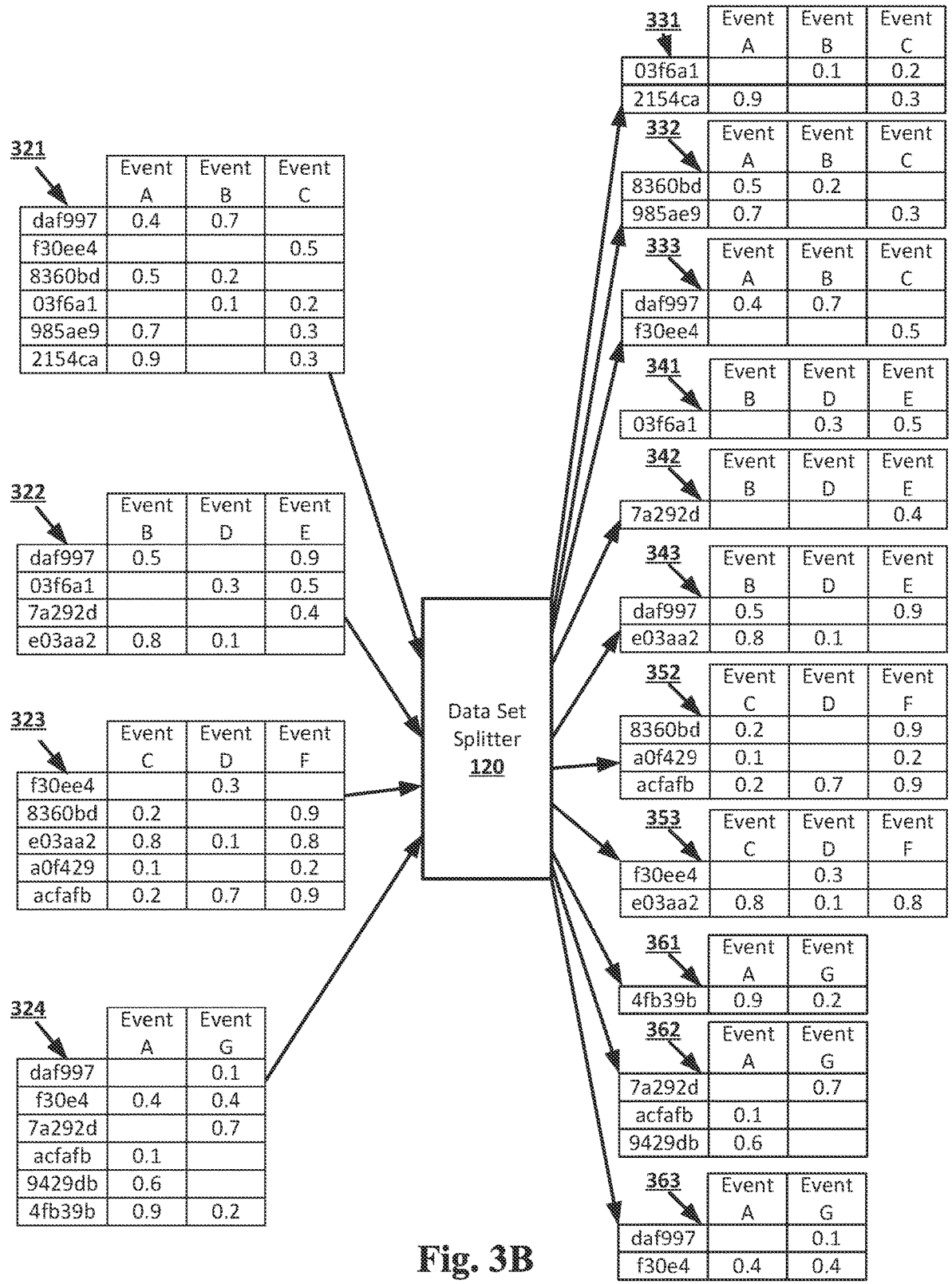
FIG. 3B shows an example arrangement suitable for data shards for distributed processing according to an implementation of the disclosed subject matter.

FIG. 3B shows an example arrangement for suitable for data shards for distributed processing according to an implementation of the disclosed subject matter. The tables 321, 322, 323, and 324 may be input to the data set splitter 120, which may generate shards. The data set splitter 120 may generate the tables 331, 332, and 333 from the table 321. The tables 331, 332, and 333 may represent the tenant A first shard 211, tenant A second shard 212, and tenant A third shard 213. The data set splitter 120 may, for example, assign rows of the table 321 with a hashed identifier that falls within the range of 00000 to 5FFFFF to the table 331, rows of the table 321 with a hashed identifier that falls within the range of 600000 to AFFFFF to the table 332, and rows of the table 321 with a hashed identifier that falls within the range of B00000 to FFFFFF to the table 333.

The tables 341, 342, and 343 may represent the tenant B first shard 214, tenant B second shard 215, and tenant B third shard 216. The data set splitter 120 may assign rows of the table 322 with a hashed identifier that falls within the range of 00000 to 5FFFFF to the table 341, rows of the table 322 with a hashed identifier that falls within the range of 600000 to AFFFFF to the table 342, and rows of the table 322 with a hashed identifier that falls within the range of B00000 to FFFFFF to the table 343.

The tables 352, and 353 may represent the tenant C second shard 218 and tenant C third shard 219. The table 323 may not include any rows with a hashed identifier that falls within the range of 00000 to 5FFFFF, so the tenant C first shard 217 may be empty. The data set splitter 120 may assign rows of the table 323 with a hashed identifier that falls within the range of 600000 to AFFFFF to the table 352, and rows of the table 323 with a hashed identifier that falls within the range of B00000 to FFFFFF to the table 353.

The tables 361, 362, and 363 may represent the tenant D first shard 219, tenant D second shard 220, and tenant D third shard 221. The data set splitter 120 may assign rows of the table 324 with a hashed identifier that falls within the range of 00000 to 5FFFFF to the table 361, rows of the table 324 with a hashed identifier that falls within the range of 600000 to AFFFFF to the table 362, and rows of the table 324 with a hashed identifier that falls within the range of B00000 to FFFFFF to the table 363.

Figure 3C:
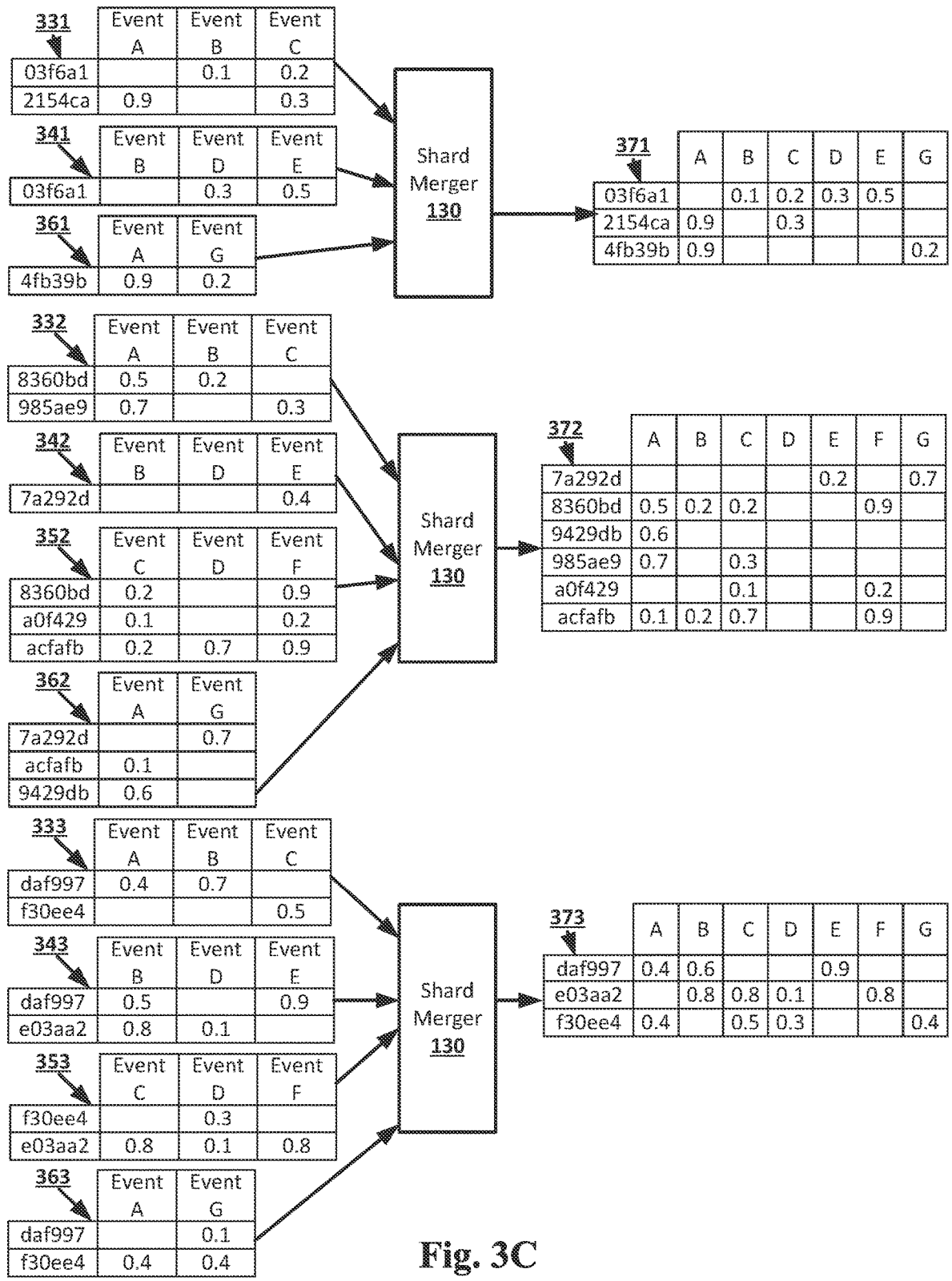
FIG. 3C shows an example arrangement suitable for data shards for distributed processing according to an implementation of the disclosed subject matter.

FIG. 3C shows an example arrangement for suitable for data shards for distributed processing according to an implementation of the disclosed subject matter. Separate processes of the shard merger 130, for example, running on the processors 230, 240, and 250 in parallel, may merge the shards 210 generated by the data set splitter 120. For example, a processing job of the shard merger 130 running on a first processor may merge tables 331, 341, and 361, representing the tenant A first shard 211, tenant B first shard 214, and tenant D first shard 220, along with the empty tenant C first shard 217, into the table 371, representing the first merged shard 260. The shard merger 130 may join the tables 331, 341, and 361, sort the result of the join by hashed identifier, and then merge rows that have duplicate hashed identifiers to generate the table 371.

A processing job of the shard merger 130 running on a second processor may merge tables 332, 342, 352, and 362, representing the tenant A second shard 212, tenant B second shard 215, tenant C second shard 218, and tenant D second shard 221, into the table 372, representing the second merged shard 270. The shard merger 130 may join the tables 332, 342, 352, and 362, sort the result of the join by hashed identifier, and then merge rows that have duplicate hashed identifiers to generate the table 372.

A processing job of the shard merger 130 running on a third processor may merge tables 333, 343, 353, and 363, representing the tenant A third shard 213, tenant B third shard 216, the tenant C third shard 219, and tenant D third shard 222, into the table 373, representing the third merged shard 270. The shard merger 130 may join the tables 333, 343, 353, and 363, sort the result of the join by hashed identifier, and then merge rows that have duplicate hashed identifiers to generate the table 373.

Figure 3D:
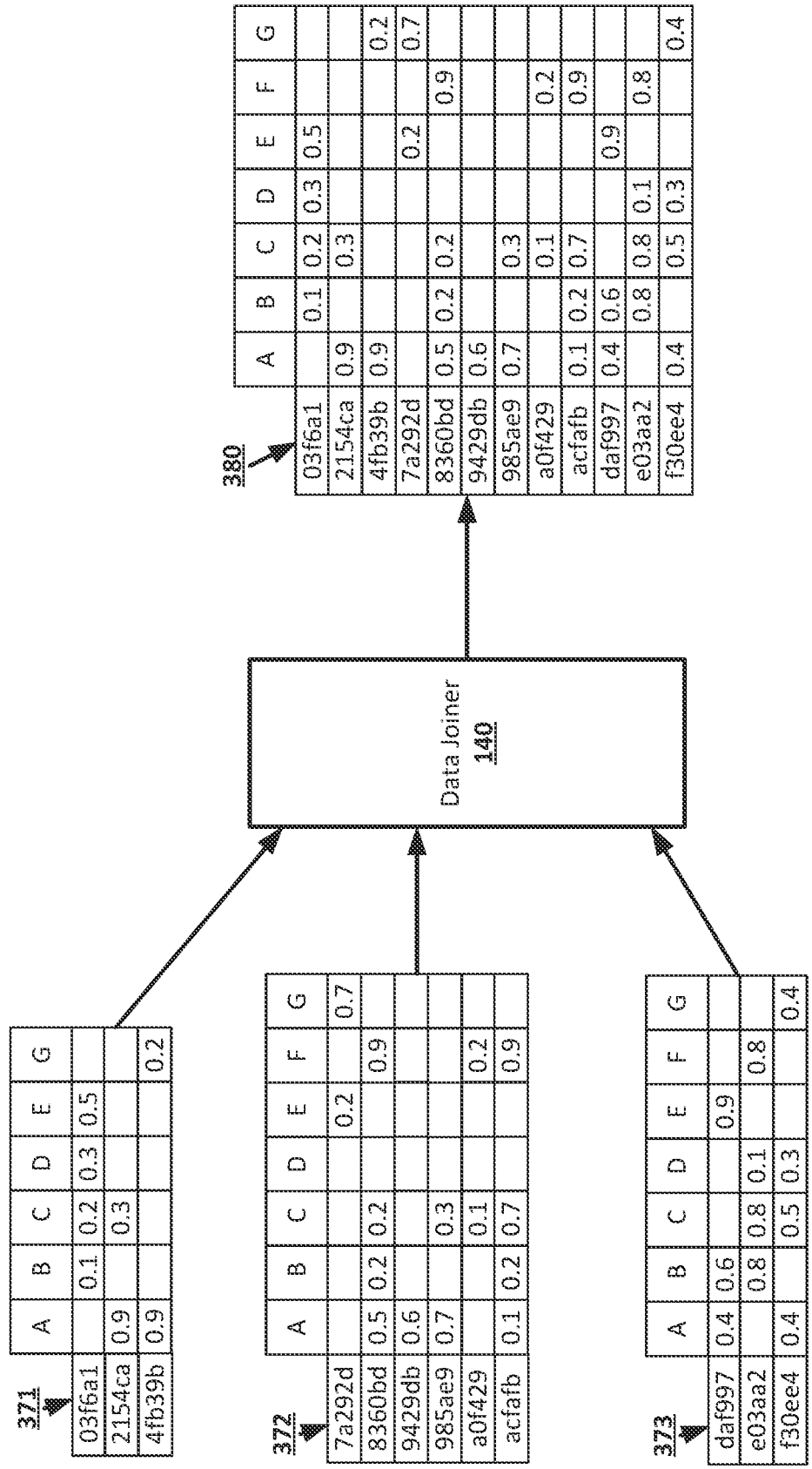
FIG. 3D shows an example arrangement suitable for data shards for distributed processing according to an implementation of the disclosed subject matter.

FIG. 3D shows an example arrangement for suitable for data shards for distributed processing according to an implementation of the disclosed subject matter. The tables 371, 372, and 373, representing the first merged shard 260, second merged shard 270, and third merged shard 280, may be input to the data joiner 140, which may generate the table 380. The data joiner 140 may join the table 371, 372, and 373, generating the table 380, which may represent the merged data set 290. The table 380 may include data from the tenant A data set 182, tenant B data set 183, tenant C data set 184, and tenant D data set 185, as the merged data set 290 may be a merger of the tenant A data set 182, tenant B data set 183, tenant C data set 184 with depersonalization through the use of hashed identifiers. The data joiner 140 may join the tables 371, 372, and 373 in order based on the alphanumeric ranges of the hashed identifiers in the tables, resulting in the table 380 being generated as already sorted in alphanumeric order by hashed identifier. The table 380, representing the merged data set 290, may be used in any suitable manner. For example, the table 380 may be used as training data for a machine learning system. The table 380 may be processed using non-negative matrix factorization to generate a matrix factorization model of the merged data set 290 that may be used, for example, as part of a product recommendation system for the tenants of the database 181 whose data was used to generate the merged data set 290.

Figure 4:
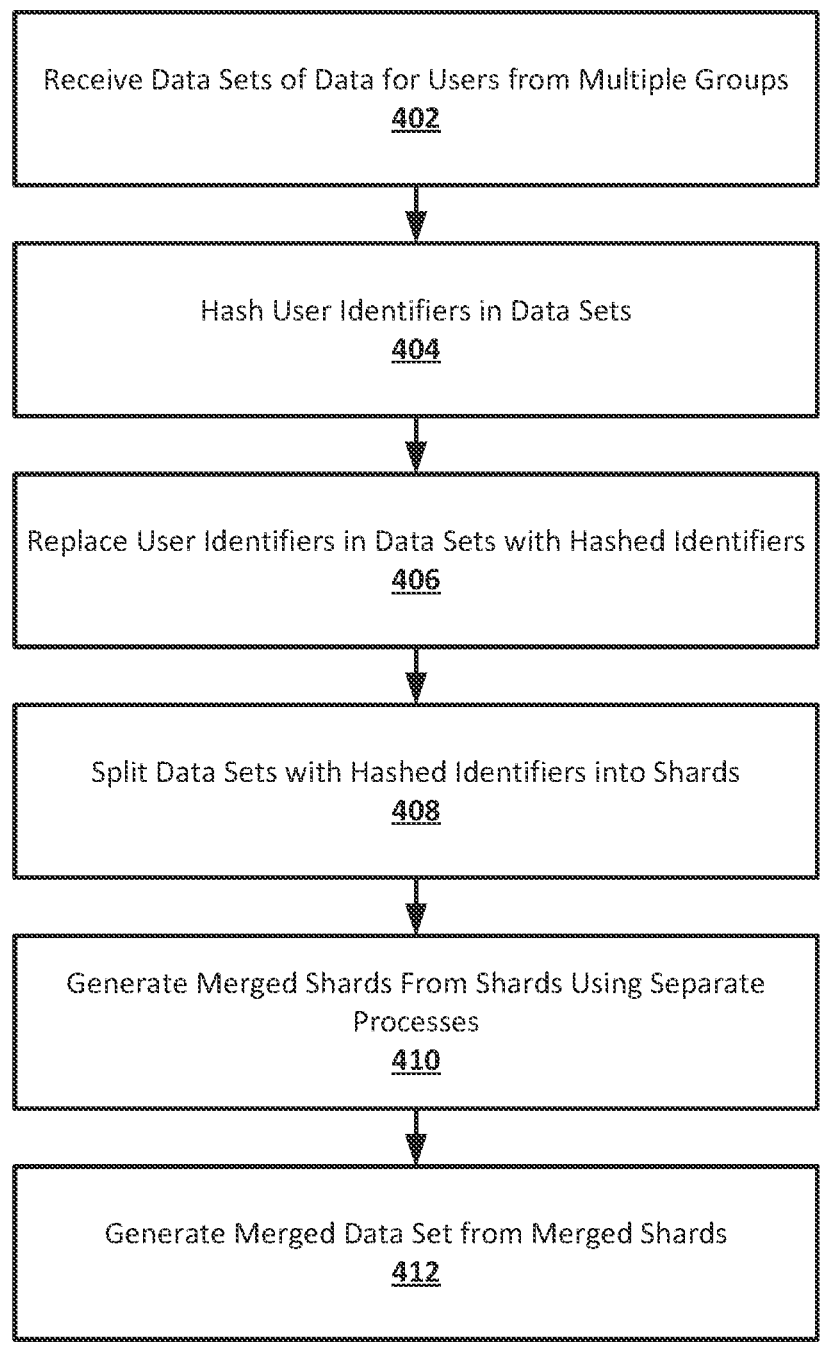
FIG. 4 shows an example procedure suitable for data shards for distributed processing according to an implementation of the disclosed subject matter.

FIG. 4 shows an example procedure suitable for data shards for distributed processing according to an implementation of the disclosed subject matter. At 502, data sets of data for users from multiple groups may be received. For example, the hasher 110 may receive data sets of data from the database 181 for groups that may be tenants of the database 181, which may be a multi-tenant database. The data sets of data may include, for example, the tenant A data set 182, the tenant B data set 183, the tenant C data set 184, and the tenant D data set 185. In some implementations, the data sets may be received from multiple databases, which may be multi-tenant or single-tenant databases. The data in the received data sets may be, for example, event data such as data indicating user preferences for items or products offered on websites or applications operated by the groups, which may be, for example, businesses or other organization. The users may be, for example, customers or subscribers of the business or organizations. The received data sets may be data sets that are to be merged into a single merged data set. The received data sets may be copies of the original data sets, which may remain in the database 181 and may not be modified during the merger of the data sets.

At 404, the user identifiers in the data sets may be hashed. For example, the hasher 110 may hash, using the same hashing algorithm, all of the user identifiers in the received data sets, for example, the tenant A data set 182, the tenant B data set 183, the tenant C data set 184, and the tenant D data set 185, generating hashed identifiers. The hashing algorithm may be any suitable hashing algorithm, and may be a one-way function.

At 406, the user identifiers in the data sets may be replaced with the hashed identifiers. For example, the hasher 110 may copy the tenant A data set 182, the tenant B data set 183, the tenant C data set 184, and the tenant D data set 185 when they are received, and may then replace the user identifiers in the copies with the hashed identifiers, with each user identifier replaced by the hashed identifier generated from itself, to generate the hashed tenant A data set 202, hashed tenant B data set 203, hashed tenant C 204 data set, and hashed tenant D data set 205. In some implementations, the data sets may first be copied, and the hasher 110 may then replace the user identifiers with hashed identifiers generated by hashing the user identifiers. Replacing the user identifiers with hashed identifiers may depersonalize the data in the data sets, protecting user privacy and providing data security to the groups, for example, database tenants, whose data sets are being merged.

At 408, data sets with hashed identifiers may be split into shards. For example, the data set splitter 120 may split the data sets that include hashed identifiers, for example, the hashed tenant A data set 202, hashed tenant B data set 203, hashed tenant C 204 data set, and hashed tenant D data set 205 into shards. Each of the data sets may be split into the same number of shards, and each shard may include data that meets a specified criteria. The criteria may be, for example, the alphanumeric range that the hashed identifier for data falls into. For example, the data sets may be divided into three shards, with the first shard including data from the data set with a hashed identifier that falls into a first alphanumeric range, the second shard including data from the data set with a hashed identifier that falls into a second alphanumeric range, and the third shard including data from the data set that falls into a third alphanumeric range. The alphanumeric ranges may be contiguous and non-overlapping, so that all hashed identifiers fall into exactly one of the alphanumeric ranges. For example, the hashed tenant A data set 202, hashed tenant B data set 203, hashed tenant C 204 data set, and hashed tenant D data set 205 may be divided in the tenant A first shard 211, tenant B first shard 214, tenant C first shard 217, tenant D first shard 220, tenant A second shard 212, tenant B second shard 215, tenant C second shard 218, and tenant D second shard 221, tenant A third shard 213, tenant B third shard 216, tenant C third shard 219, and tenant D third shard 222. The tenant A first shard 211, tenant B first shard 214, tenant C first shard 217, tenant D first shard 220 may be equivalent shards, for example, including data that has hashed identifiers from the same alphanumeric range. The tenant A second shard 212, tenant B second shard 215, tenant C second shard 218, and tenant D second shard 221 may be equivalent shards, and the tenant A third shard 213, tenant B third shard 216, tenant C third shard 219, and tenant D third shard 222 may be equivalent shards.

At 410, merged shards may be generated from the shards using separate processes. For example, a processing job of the shard merger 130 may run on a number of separate processors, and may, in parallel, merge shards to generate merged shards. The number of processors may be equal to the number of shards each data set was split into for maximum parallelism, or may be fewer depending on the number of shards and processor availability, but may be more than one processor to avoid serializing the merger process. For example, the shard merger 130 may run in parallel on the processors 230, 240, and 250. The shard merger 130 on the processor 230 may merge the tenant A first shard 211, tenant B first shard 214, tenant C first shard 217, tenant D first shard 220 into a first merged shard 260 by joining the shards, sorting the shards by hashed identifier, and merging data for any duplicate hashed identifiers. The shard merger 130 on the processor 240 may similarly generate the second merged shard 270 by merging the tenant A second shard 212, tenant B second shard 215, tenant C second shard 218, and the tenant D second shard 221, and the shard merger 130 on the processor 250 may merge the tenant A third shard 213, tenant B third shard 216, tenant C third shard 219, and tenant D third shard 222 to generate the merged shard 280.

At 412, a merged data set may be generated from the merged shards. For example, the data joiner 140 may join the first merged shard 260, second merged shard 270, and third merged shard 280 into the merged data set 290. The merged data set 290 may include data from the tenant A data set 182, the tenant B data set 183, the tenant C data set 184, and the tenant D data set 185 depersonalized with hashed identifiers and with data for common users merged.

Figure 5:
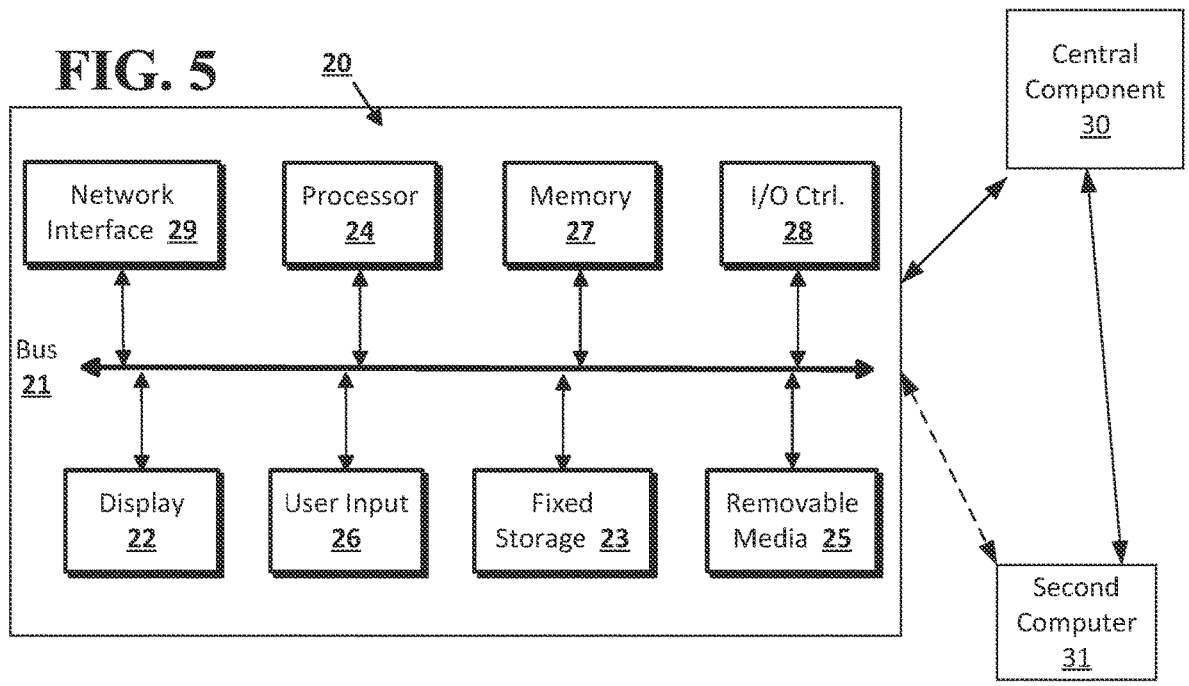
FIG. 5 shows a computer according to an implementation of the disclosed subject matter.

Implementations of the presently disclosed subject matter may be implemented in and used with a variety of component and network architectures. FIG. 5 is an example computer 20 suitable for implementing implementations of the presently disclosed subject matter. As discussed in further detail herein, the computer 20 may be a single computer in a network of multiple computers. As shown in FIG. 5, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 6.

Many other devices or components (not shown) may be connected in a similar manner (e.g., document scanners, digital cameras and so on). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, removable media 25, or on a remote storage location.

Figure 6:
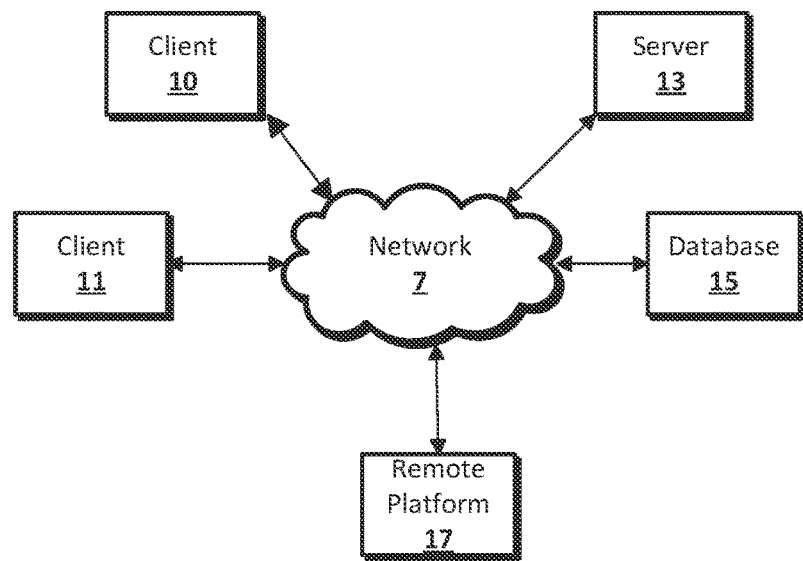
FIG. 6 shows a network configuration according to an implementation of the disclosed subject matter.

FIG. 6 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
receiving two or more data sets of data for users wherein each of the two or more data sets belongs to a separate one of two or more groups;
hashing user identifiers in the two or more data sets to generate hashed identifiers for the two or more data sets;
replacing the user identifiers in the two or more data sets with the hashed identifiers;
splitting each of the two or more data sets to generate shards, wherein each of the two or more data sets is split into the same number of shards by splitting each of the two more data sets such that the hashed identifiers that are common to two or more of the two or more data sets are in equivalent shards from the two or more of the two or more data sets;

generating merged shards by merging the shards using a separate running process for each of the merged shards, wherein each of the merged shards is generated using shards from more than one of the two or more data sets;

performing an operation on all of the merged shards wherein performing an operation on all of the merged shards comprises joining the merged shards into a merged data set; and training a machine learning system using the merged data set.

2. The computer-implemented method of claim 1, wherein performing an operation on each of the merged shards comprises performing non-negative matrix factorization on the merged shards.

3. The computer-implemented method of claim 1, wherein equivalent shards of the two or more data sets comprise shards assigned data from separate data sets based on the same criteria.

4. The computer-implemented method of claim 3, wherein the criteria comprises an alphanumeric range that a hashed identifier for the data falls into.

5. The computer-implemented method of claim 1, wherein generating merged shards by merging the shards using a separate running process for each of the merged shards, wherein each of the merged shards is generated using shards from more than one of the two or more data sets comprises merging a first set of equivalent shards from the shards on a first processor and merging a second set of equivalent shards from the shards on a second processor in parallel.

6. The computer-implemented method of claim 5, wherein merging a first set of equivalent shards from the shards on the first processor further comprises:
    joining the data in the equivalent shards;
    sorting the data in the equivalent shards by hashed identifier; and
    merging data for any duplicate hashed identifiers.

7. A computer-implemented system for localization of matrix factorization models trained with global data comprising:
    one or more storage devices; and
    two or more processors that receive two or more data sets of data for users wherein each of the two or more data sets belongs to a separate one of two or more groups with a first of the two or processors,
    hash user identifiers in the two or more data sets to generate hashed identifiers for the two or more data sets with the first of the two or processors,
    replace the user identifiers in the two or more data sets with the hashed identifiers with the first of the two or processors,
    split each of the two or more data sets to generate shards, wherein each of the two or more data sets is split into the same number of shards with the first of the two or processors by splitting each of the two more data sets such that the hashed identifiers that are common to two or more of the two or more data sets are in equivalent shards from the two or more of the two or more data sets,
    generate merged shards by merging the shards using a separate running process on each of the two or more processors for each of the merged shards, wherein each of the merged shards is generated using shards from more than one of the two or more data sets,
    perform an operation on all of the merged shards with the first of the two or processors wherein performing an operation on all of the merged shards comprises joining the merged shards into a merged data set and,
    training a machine learning system using the merged data set.

8. The computer-implemented system of claim 7, wherein the first of the two or more processors performs an operation on each of the merged shards by performing non-negative matrix factorization on the merged shards.

9. The computer-implemented system of claim 7, wherein equivalent shards of the two or more data sets comprise shards assigned data from separate data sets based on the same criteria.

10. The computer-implemented system of claim 9, wherein the criteria comprises an alphanumeric range that a hashed identifier for the data falls into.

11. The computer-implemented system of claim 7, wherein the two or more processors generate merged shards by merging the shards using a separate running process on each of the two or more processors for each of the merged shards, wherein each of the merged shards is generated using shards from more than one of the two or more data sets by merging a first set of equivalent shards from the shards on a first processor and merging a second set of equivalent shards from the shards on a second processor in parallel.

12. The computer-implemented system of claim 11, wherein the first of the two or more processors merges a first set of equivalent shards from the shards on the first processor further by
    joining the data in the equivalent shards,
    sorting the data in the equivalent shards by hashed identifier, and
    merging data for any duplicate hashed identifiers.

13. A system comprising: one or more computers and one or more non-transitory storage devices storing instructions which are operable, when executed by the one or more computers, to cause the one or more computers to perform operations comprising:
    receiving two or more data sets of data for users wherein each of the two or more data sets belongs to a separate one of two or more groups;
    hashing user identifiers in the two or more data sets to generate hashed identifiers for the two or more data sets;
    replacing the user identifiers in the two or more data sets with the hashed identifiers;
    splitting each of the two or more data sets to generate shards, wherein each of the two or more data sets is split into the same number of shards by splitting each of the two more data sets such that the hashed identifiers that are common to two or more of the two or more data sets are in equivalent shards from the two or more of the two or more data sets;
    generating merged shards by merging the shards using a separate running process for each of the merged shards, wherein each of the merged shards is generated using shards from more than one of the two or more data sets;
    performing an operation on all of the merged shards wherein performing an operation on all of the merged shards comprises joining the merged shards into a merged data set; and
    training a machine learning system using the merged data set.

14. The system of claim 13, wherein the instructions that cause the one or more computers to perform operations comprising generating merged shards by merging the shards using a separate running process for each of the merged shards, wherein each of the merged shards is generated using shards from more than one of the two or more data sets further cause the one or more computers to perform operations comprising merging a first set of equivalent shards from the shards on a first processor and merging a second set of equivalent shards from the shards on a second processor in parallel.

15. The system of claim 14, wherein the instructions that cause the one or more computers to perform operations comprising merging a first set of equivalent shards from the shards on the first processor further cause the one or more computers to perform operations comprising:

- joining the data in the equivalent shards;
- sorting the data in the equivalent shards by hashed identifier; and
- merging data for any duplicate hashed identifiers.

* * * * *